United States Patent
Doi

(10) Patent No.: US 9,201,645 B2
(45) Date of Patent: Dec. 1, 2015

(54) PROGRAM DISTRIBUTION DEVICE, PROGRAM DISTRIBUTION METHOD, PROGRAM DISTRIBUTION SYSTEM, AND STORAGE MEDIUM

(71) Applicant: NEC Corporation, Minto-ku, Tokyo (JP)

(72) Inventor: Nire Doi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/577,158

(22) Filed: Dec. 19, 2014

(65) Prior Publication Data

US 2015/0178070 A1  Jun. 25, 2015

(30) Foreign Application Priority Data

Dec. 25, 2013  (JP) .................................. 2013-267092

(51) Int. Cl.
*G06F 9/445* (2006.01)
*H04L 29/08* (2006.01)

(52) U.S. Cl.
CPC ........ *G06F 8/65* (2013.01); *H04L 67/10* (2013.01); *G06F 8/61* (2013.01); *G06F 8/64* (2013.01)

(58) Field of Classification Search
None
See application file for complete search history.

(56) References Cited

U.S. PATENT DOCUMENTS 8,171,465 B2 * 5/2012 Kodaka et al. ................ 717/168
2004/0210653 A1 * 10/2004 Kanoor et al. ................ 709/223

FOREIGN PATENT DOCUMENTS

| JP | H07-334436 A | 12/1995 |
| JP | 2003233512 A | 8/2003 |
| JP | 2008071110 A | 3/2008 |
| JP | 2009217637 A | 9/2009 |
| JP | 2010250749 A | 11/2010 |
| JP | 2013069044 A | 4/2013 |
| JP | 2013-206075 A | 10/2013 |
| WO | 2007/105274 A1 | 9/2007 |

OTHER PUBLICATIONS

Japanese Office Action for JP Application No. 2013-267092 mailed on Oct. 28, 2014 with English Translation.

* cited by examiner

*Primary Examiner* — Isaac T Tecklu
*Assistant Examiner* — Shirin Alizadeh

(57) ABSTRACT

Disclosed is a program distribution device that enables to distribute programs in a more appropriate order with respect to an electronic device to which the programs are distributed. The program distribution device includes an appropriateness determination unit which executes an appropriateness determination processing on the basis of policy information, and distributes the update program to the target device in accordance with a result of determination.

8 Claims, 13 Drawing Sheets

Fig. 2

| SERVER DEVICE NAME | UPDATE PROGRAM NAME | APPLICATION STATUS OF UPDATE PROGRAM |
|---|---|---|
| Server_1 | Update_1 | Y |
| Server_1 | Update_2 | N |
| Server_1 | .. | .. |
| Server_1 | Update_n | N |
| Server_2 | Update_1 | Y |
| Server_2 | Update_2 | Y |
| Server_2 | .. | .. |
| Server_2 | Update_n | Y |
| .. | .. | .. |
| Server_N | Update_1 | — |
| .. | .. | .. |

Fig. 3

| UPDATE PROGRAM NAME | DEGREE OF PRIORITY FOR UPDATE PROGRAM | DEGREE OF IMPORTANCE FOR UPDATE PROGRAM | TYPE OF UPDATE PROGRAM | SIZE OF UPDATE PROGRAM | TIMESTAMP |
|---|---|---|---|---|---|
| Update_1 | A | A | ADD FUNCTION | xx MB | 20yy/mm/dd hh:mm:ss |
| Update_2 | A | A | SECURITY MEASURES | xx MB | 20yy/mm/dd hh:mm:ss |
| Update_3 | A | B | CORRECT DEFECTS | xx MB | 20yy/mm/dd hh:mm:ss |
| Update_4 | B | A | CORRECT DEFECTS | xx MB | 20yy/mm/dd hh:mm:ss |
| Update_5 | B | C | ADD FUNCTION | xx MB | 20yy/mm/dd hh:mm:ss |
| .... | .... | .... | .... | .... | .... |
| Update_n | B | B | SECURITY MEASURES | xx MB | 20yy/mm/dd hh:mm:ss |

Fig. 4

| UPDATE PROGRAM NAME | TYPE OF UPDATE PROGRAM | SERVER DEVICE NAME | DEGREE OF IMPORTANCE FOR SERVER DEVICE |
|---|---|---|---|
| Update_5 | SECURITY MEASURES | Server_2 | A |
| Update_6 | SECURITY MEASURES | Server_2 | A |
| Update_5 | SECURITY MEASURES | Server_1 | B |
| Update_6 | SECURITY MEASURES | Server_1 | B |
| Update_5 | SECURITY MEASURES | Server_3 | C |
| Update_6 | SECURITY MEASURES | Server_3 | C |
| ... | ... | ... | ... |
| Update_3 | CORRECT DEFECTS | Server_2 | A |
| Update_4 | CORRECT DEFECTS | Server_2 | A |
| Update_3 | CORRECT DEFECTS | Server_1 | B |
| Update_4 | CORRECT DEFECTS | Server_1 | B |
| Update_3 | CORRECT DEFECTS | Server_3 | C |
| Update_4 | CORRECT DEFECTS | Server_3 | C |
| ... | ... | ... | ... |
| Update_7 | IMPROVE PERFORMANCE | Server_2 | A |
| Update_8 | IMPROVE PERFORMANCE | Server_2 | A |
| Update_7 | IMPROVE PERFORMANCE | Server_1 | B |
| Update_8 | IMPROVE PERFORMANCE | Server_1 | B |
| Update_7 | IMPROVE PERFORMANCE | Server_3 | C |
| Update_8 | IMPROVE PERFORMANCE | Server_3 | C |

Fig. 6

| SERVER DEVICE NAME | DEGREE OF IMPORTANCE FOR SERVER DEVICE | PURPOSE OF USE OF SERVER DEVICE | CPU UTILIZATION | NETWORK STATUS | OTHER MANAGEMENT ITEMS |
|---|---|---|---|---|---|
| Server_1 | B | PURPOSE OF USE a | x% | MODERATELY GOOD | ... |
| Server_2 | A | PURPOSE OF USE a | y% | IN GOOD CONDITION | ... |
| ... | ... | ... | ... | ... | ... |
| Server_N | C | PURPOSE OF USE n | z% | MODERATELY POOR | ... |

Fig. 7

| PURPOSE OF USE OF SERVER DEVICE | DEGREE OF PRIORITY FOR UPDATE PROGRAM | MULTIPLYING FACTOR WITH RESPECT TO UPDATE PROGRAM SIZE | MULTIPLYING FACTOR WITH RESPECT TO CPU UTILIZATION |
|---|---|---|---|
| PURPOSE OF USE s | A | A1% | A2% |
| PURPOSE OF USE b | B | B1% | B2% |
| .... | .... | .... | .... |
| PURPOSE OF USE n | A | N1% | N2% |

Fig. 8

| TYPE OF UPDATE PROGRAM | DEGREE OF IMPORTANCE FOR UPDATE PROGRAM | DEGREE OF IMPORTANCE FOR SERVER DEVICE | THRESHOLD VALUE FOR NETWORK STATUS | THRESHOLD VALUE FOR UPDATE PROGRAM SIZE | THRESHOLD VALUE FOR CPU UTILIZATION |
|---|---|---|---|---|---|
| SECURITY MEASURES | A | A | IN POOR CONDITION | X1 MB | Y1% |
| SECURITY MEASURES | B | A | IN POOR CONDITION | X2MB | Y2% |
| SECURITY MEASURES | C | A | IN POOR CONDITION | X3MB | Y3% |
| CORRECT DEFECTS | A | A | IN POOR CONDITION | X4MB | Y4% |
| CORRECT DEFECTS | B | A | IN POOR CONDITION | X5MB | Y5% |
| CORRECT DEFECTS | C | A | IN POOR CONDITION | X6MB | Y6% |
| IMPROVE PERFORMANCE | A | A | MODERATELY POOR OR IN POOR CONDITION | X7MB | Y7% |
| IMPROVE PERFORMANCE | B | A | MODERATELY POOR OR IN POOR CONDITION | X8MB | Y8% |
| IMPROVE PERFORMANCE | C | A | MODERATELY POOR OR IN POOR CONDITION | X9MB | Y9% |
| ADD FUNCTION | A | A | MODERATELY POOR OR IN POOR CONDITION | X1AMB | Y1A% |
| ADD FUNCTION | B | A | MODERATELY POOR OR IN POOR CONDITION | X1BMB | Y1B% |
| ADD FUNCTION | C | A | MODERATELY POOR OR IN POOR CONDITION | X1CMB | Y1C% |
| SECURITY MEASURES | A | B | IN POOR CONDITION | X21MB | Y21% |
| ... | ... | ... | ... | ... | ... |

Fig. 11

| TYPE OF UPDATE PROGRAM | DEGREE OF IMPORTANCE FOR SERVER DEVICE | NUMBER OF TIMES OF RETRYING |
|---|---|---|
| SECURITY MEASURES | A | X1 TIME |
| SECURITY MEASURES | B | X2 TIME |
| SECURITY MEASURES | C | X3 TIME |
| CORRECT DEFECTS | A | X4 TIME |
| CORRECT DEFECTS | B | X5 TIME |
| CORRECT DEFECTS | C | X6 TIME |
| IMPROVE PERFORMANCE | A | X7 TIME |
| IMPROVE PERFORMANCE | B | X8 TIME |
| IMPROVE PERFORMANCE | C | X9 TIME |
| ADD FUNCTION | A | XA TIME |
| ADD FUNCTION | B | XB TIME |
| ADD FUNCTION | C | XC TIME |

PROGRAM DISTRIBUTION DEVICE, PROGRAM DISTRIBUTION METHOD, PROGRAM DISTRIBUTION SYSTEM, AND STORAGE MEDIUM

This application is based upon and claims the benefit of priority from Japanese Patent Application No. 2013-267092, filed on Dec. 25, 2013, the disclosure of which is incorporated herein in its entirety by reference.

TECHNICAL FIELD

The present invention relates to a technical field in which programs such as programs for update are distributed to an electronic device.

BACKGROUND ART

In an electronic device such as a server device or a personal computer, it is necessary to apply programs for update, for instance, for the purpose of improving the performance and the functions of the own-device with respect to an operating system loaded in the own-device, for the purpose of correcting defects, or the like. To simplify the description, in the present application, a program for update is also called as an "update program". In addition to these purposes, it is necessary to apply security-related programs for update to the electronic device, for instance, for the purpose of preventing damage due to malicious virus or invasion from a third person.

There are versatile techniques for more efficiently applying these programs for update to the electronic device. For instance, Patent Literature 1 executes data processing while avoiding the time of heavy traffic of networks or devices at the time of updating software programs. Patent Literature 1 discloses a technique relating to a distribution system of preventing lowering of processing efficiency in a system.

The distribution system disclosed in Patent Literature 1 (Japanese Laid-open Patent Publication No. 2013-206075) is provided with a first server which transmits the update program to a device via a network communicatively connected to the device, and a second server which stores the update program. The distribution system transmits the update program to the device, when a communication status between the first server and the second server, and a communication status between the first server and the device satisfy a communication threshold value. The distribution system also transmits the update program to the device, when the load status of the network, a memory, or a CPU (Central Processing Unit: hereinafter, called as a "CPU" in the present application) with respect to the device satisfies the threshold value.

Meanwhile, for instance, the degree of significance of a server device differs depending on the processing to be performed by the server device or data to be handed by the server device, when the update program is applied to the server device. For instance, a manager of server devices may wish to prioritize application of the update program to the server device whose degree of importance is high. Further, the manager may wish to promptly apply the update program whose purpose is to provide security measures having a high degree of urgency or to correct defects, prior to the update program whose purpose is to improve the performance or to add a function. On the other hand, the degree of urgency differs depending on the contents of defects to be corrected, even when the defects are corrected, for instance. In view of the above, the manager may wish to prioritize application of the update program whose degree of urgency is high and whose degree of importance is high. However, a generally known technique of applying update programs to the electronic device does not take into account that update programs are distributed in accordance with the degrees of significance or the purpose of uses of electronic devices or in accordance with the degrees of significance or the types of programs for update, and does not describe a solution. In other words, the existing technique is insufficient, even when update programs are applied in the descending order of the degree of urgency and the degree of importance.

Further, the distribution system disclosed in Patent Literature 1 takes into account a status of a network line and a load status of the server device, when it is determined whether or not it is appropriate to apply the update program to the server device. Patent Literature 1 merely describes that the distribution system prevents an increase in the network load and lowering of processing efficiency. Thus, Patent Literature 1 does not take into account and describe that programs for update are distributed in accordance with the degrees of significance and the purposes of use of server devices and in accordance with the degrees of significance and the types of programs for update.

A primary object of the invention is to provide a program distribution device and the like that enable to distribute programs in a more appropriate order with respect to an electronic device to which the programs are distributed.

SUMMARY

In order to achieve the object, a program distribution device of the invention has the following configuration.

That is, a program distribution device includes:

an appropriateness determination unit that executes an appropriateness determination processing, which determines whether or not an update program is applied to a target device to which the update program is applied on the basis of policy information, the policy information being defined in accordance with a degree of importance and a purpose of use of the target device and in accordance with a type and a degree of importance for the update program, and distributes the update program to the target device via a distribution unit when it is determined that the update program is applied to the target device.

The object is also achieved by a program distribution system including the program distribution device as described above.

In order to achieve the object, a program distribution method of the invention has the following configuration.

That is, a program distribution method includes, causing an information processing device to:

execute an appropriateness determination processing, which determines whether or not an update program is applied to a target device to which the update program is applied, on the basis of policy information, the policy information being defined in accordance with a degree of importance and a purpose of use of the target device and in accordance with a type and a degree of importance for the update program; and distribute the update program to the target device via a distribution unit when it is determined that the update program is applied to the target device.

The aforementioned object is also achieved by a computer program which implements the program distribution device and the program distribution method having the aforementioned configurations by a computer, and by a readable storage medium stored with the computer program.

Advantageous Effect of Invention

According to the invention, it is possible to provide a program distribution device that enables to distribute programs in a more appropriate order with respect to an electronic device to which the programs are distributed.

BRIEF DESCRIPTION OF THE DRAWINGS

Exemplary features and advantages of the present invention will become apparent from the following detailed description when taken with the accompanying drawings in which:

FIG. 2 is a diagram concretely exemplifying application information in the first exemplary embodiment of the invention;

FIG. 3 is a diagram concretely exemplifying program information in the first exemplary embodiment of the invention;

FIG. 4 is a diagram concretely exemplifying an application determination list in the first exemplary embodiment of the invention;

FIG. 6 is a diagram concretely exemplifying server information in the first exemplary embodiment of the invention;

FIG. 7 is a diagram concretely exemplifying second policy information in the first exemplary embodiment of the invention;

FIG. 8 is a diagram exemplifying first policy information in the first exemplary embodiment of the invention;

FIG. 11 is a diagram concretely exemplifying third policy information in the second exemplary embodiment of the invention.

EXEMPLARY EMBODIMENT

Figure 1:
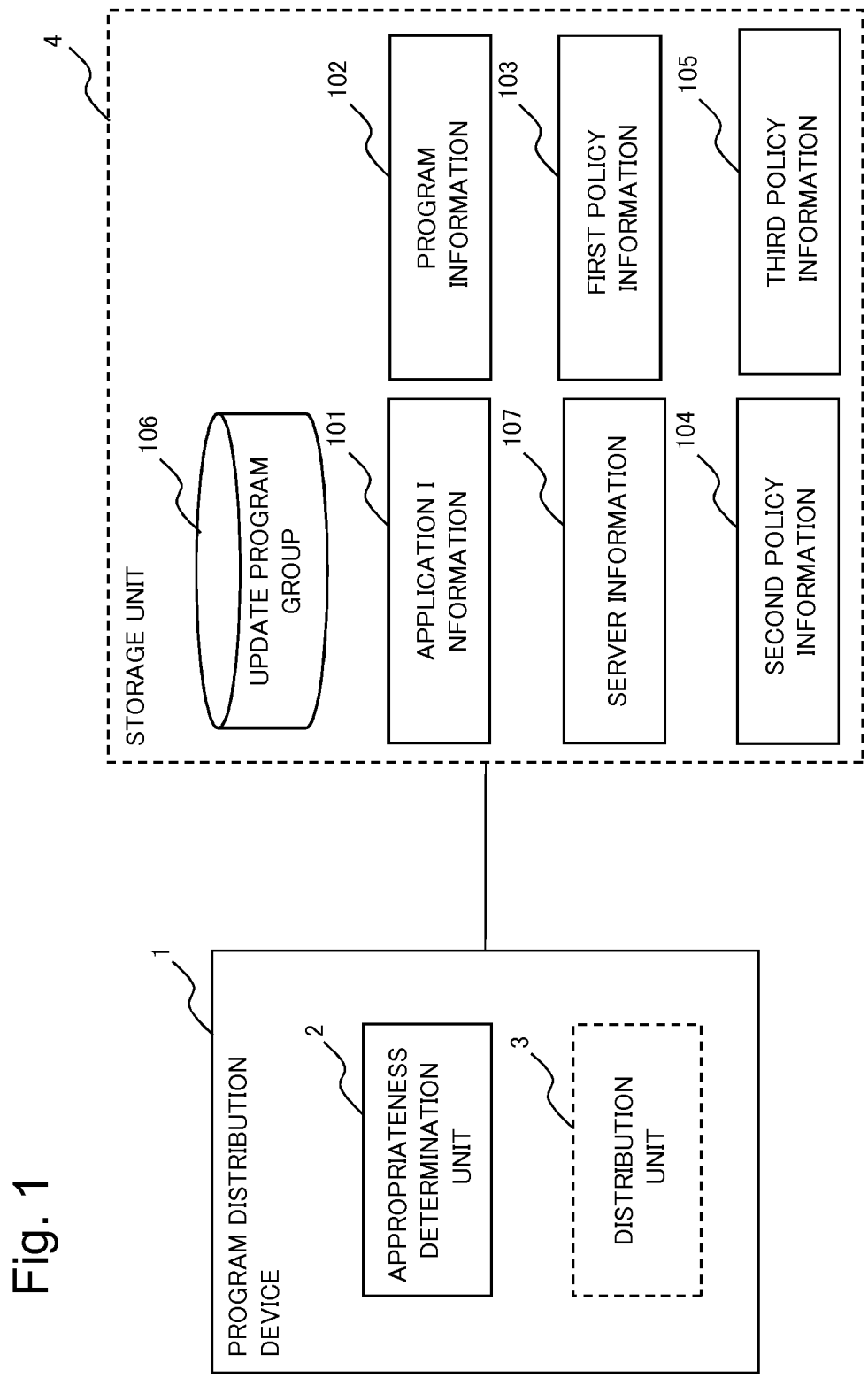
FIG. 1 is a block diagram illustrating a configuration of a program distribution device in a first exemplary embodiment of the invention.

In the following, exemplary embodiments of the invention are described in detail referring to the drawings.

First Exemplary Embodiment

FIG. 1 is a block diagram illustrating a configuration of a program distribution device 1 in a first exemplary embodiment of the invention.

In FIG. 1, the program distribution device 1 includes an appropriateness determination unit 2.

More specifically, the appropriateness determination unit 2 executes a program for update distribution processing at a predetermined time interval. To simplify the description, hereinafter, a program for update is also called as an "update program".

Examples of the update program are programs whose purpose is to correct defects with respect to an operating system loaded in an electronic device such as a server device or a personal computer, to provide security measures, to improve the performance, and to add a function. To simplify the description, hereinafter, an operating system is called as an "OS (Operating System)".

The appropriateness determination unit 2 determines the presence or absence of an update program which is not applied to a target device such as a server device, which is managed by the program distribution device 1, on the basis of application information 101 stored in a storage unit 4. Specifically, the appropriateness determination unit 2 determines the presence or absence of an unapplied update program with respect to the target device on the basis of the application information 101. Further, the appropriateness determination unit 2 executes the following processing, when it is determined that there is an unapplied update program with respect to the server device, as a result of determination. Specifically, the appropriateness determination unit 2 generates an application determination list on the basis of the application information 101, and program information 102 stored in the storage unit 4. The application determination list includes the names of server devices, and the names of unapplied update programs with respect to the server devices.

The appropriateness determination unit 2 sorts the information items included in the application determination list in the descending order of the types of update programs and in the descending order of the degrees of significance of server devices, when the application determination list is generated. Specifically, the appropriateness determination unit 2 rearranges the information items included in the application determination list in the descending order of the types of update programs and in the descending order of the degrees of significance of server devices.

According to this configuration, the program distribution device 1 is capable of prioritizing distribution of an update program to a server device whose degree of urgency is high and whose degree of importance is high.

The application information 101, the program information 102, and the application determination list are described in more detail.

The application information 101 is information for the purpose of which one or more server devices, and application statuses of update programs with respect to the server devices are managed.

More specifically, the application information 101 includes information representing one or more server devices, and application statuses of update programs, for each of the update programs to be applied to the server devices. In other words, the application information 101 includes information such that information representing "name of server device (server device name)", "name of update program (update program name)", and "application status of update program" are associated with each other.

FIG. 2 is a diagram concretely exemplifying the application information 101 in the first exemplary embodiment of the invention.

The first column of the application information 101 shown in FIG. 2 illustrates "server device name". The second column illustrates "update program name". The third column illustrates "application status of update program".

"Application status of update program" includes information "Y" representing that the update program has already been applied to the server device. On the other hand, "application status of update program" includes information "N" representing that the update program is not applied to the server device (in other words, "unapplied"). Furthermore, "application status of update program" includes information "-" representing that it is not confirmed whether or not the update program has been applied to the server device.

The program information 102 includes one or more update programs, and information relating to the update programs, for each of the update programs.

More specifically, the program information 102 includes information such that "update program name", "degree of priority for update program", "degree of importance for update program", "type of update program", "size of update program", and "timestamp" are associated with each other.

"Degree of priority for update program" is, for instance, information based on which it is possible to determine whether or not the update program to be applied is an update program to be prioritized.

"Degree of priority for update program" includes information such that update programs are classified into "A" rank, "B" rank, and "C" rank in the descending order of the degree of priority, for each of the update programs.

As described above, providing the update programs with the degrees of priority makes it possible for the program distribution device 1 to distribute the update programs in a more appropriate order. This is because the program distribution device 1 is further capable of determining whether or not even an update program having a high degree of importance is an update program to be prioritized.

"Type of update program" is information representing the types of update programs.

More specifically, when the update program is a program for the purpose of correcting defects, "type of update program" represents "correct defects". Further, when the update program is a security-related program, "type of update program" represents "security measures". When the update program is a program for the purpose of improving the performance, "type of update program" represents "improve performance".

"Degree of importance for update program" is information representing degrees of significance, which are set in accordance with the objects to be accomplished by applying update programs.

"Degree of importance for update program" includes information such that update programs are classified into "A" rank, "B" rank, and "C" rank in the descending order of the degree of importance in accordance with the degrees of significance of the update programs. For instance, when the update program is a program for the purpose of providing security measures, "degree of importance for update program" includes information "A" representing a highest degree of importance.

"Timestamp" is information representing dates (start dates) when disclosure of update programs has started. "Size of update program" is information representing the file sizes of update programs.

FIG. 3 is a diagram concretely exemplifying the program information 102 in the first exemplary embodiment of the invention.

The first column of the program information 102 shown in FIG. 3 illustrates "update program name". The second column illustrates "degree of priority for update program". The third column illustrates "degree of importance for update program". The fourth column illustrates "type of update program". The fifth column illustrates "size of update program". The sixth column illustrates "timestamp".

The application determination list includes information such that "update program name", "type of update program", "server device name", and "degree of importance for server device" are associated with each other.

FIG. 4 is a diagram concretely exemplifying the application determination list in the first exemplary embodiment of the invention.

The first column of the application determination list shown in FIG. 4 illustrates "update program name". The second column illustrates "type of update program". The third column illustrates "server device name". The fourth column illustrates "degree of importance for server device".

"Degree of importance for server device" is information, for instance, representing degrees of significance, which are set in accordance with the processes to be performed by server devices or in accordance with the data to be handled by server devices.

More specifically, "degree of importance for server device" includes, for instance, information such that server devices are classified into "A" rank, "B" rank, and "C" rank in the descending order of the degree of importance in accordance with the degrees of significance of the server devices.

The appropriateness determination unit 2 determines whether or not an update program is applied to a server device on the basis of policy information (first policy information 103, second policy information 104, and third policy information 105). Specifically, the appropriateness determination unit 2 executes an appropriateness determination processing of the update program with respect to the server device on the basis of the policy information (the appropriateness determination processing will be described later in detail in the present exemplary embodiment).

The policy information is information, which is defined in accordance with the degrees of significance of server devices to which update programs are distributed, the purposes of use of server devices, the types of update programs to be distributed, and the degree of importance for update programs.

Further, the appropriateness determination unit 2 determines whether the update program is distributed to the server device, or the appropriateness determination processing is retried in accordance with a result of determination by the appropriateness determination processing.

More specifically, when the appropriateness determination unit 2 determines that the update program is applied to the server device as a result of determination, the appropriateness determination unit 2 distributes the update program included in an update program group 106 stored in the storage unit 4 to the server device via a distribution unit 3. In other words, the appropriateness determination unit 2 controls the distribution unit 3 to distribute the update program to the server device.

In this way, the server device receives the update program distributed from the distribution unit 3. Thus, the server device is capable of applying the received update program.

Further, the appropriateness determination unit 2 includes, in the application information 101 stored in the storage unit 4, information representing that the update program has been applied to the server device on the basis of "server device name" of the server device, and "update program name" of the distributed update program.

The update program group 106 includes one or more update programs to be distributed by the program distribution device 1.

On the other hand, when it is determined that the update program is not applied to the server device as a result of determination, the appropriateness determination unit 2 repeatedly executes (namely, retries) the appropriateness determination processing until a predetermined number of times.

Alternatively, for instance, the appropriateness determination unit 2 may be configured to retry the appropriateness determination processing at a predetermined time interval.

Further, when the appropriateness determination unit 2 has retried the appropriateness determination processing until the predetermined number of times, the appropriateness determination unit 2 postpones distribution of the update program to the server device. Then, the appropriateness determination unit 2 includes, in the application information 101 stored in the storage unit 4, information representing that the update program is not applied to the server device (in other words, unapplied) on the basis of "server device name" of the target device, and "update program name" of the update program whose distribution has been postponed.

Figure 9:
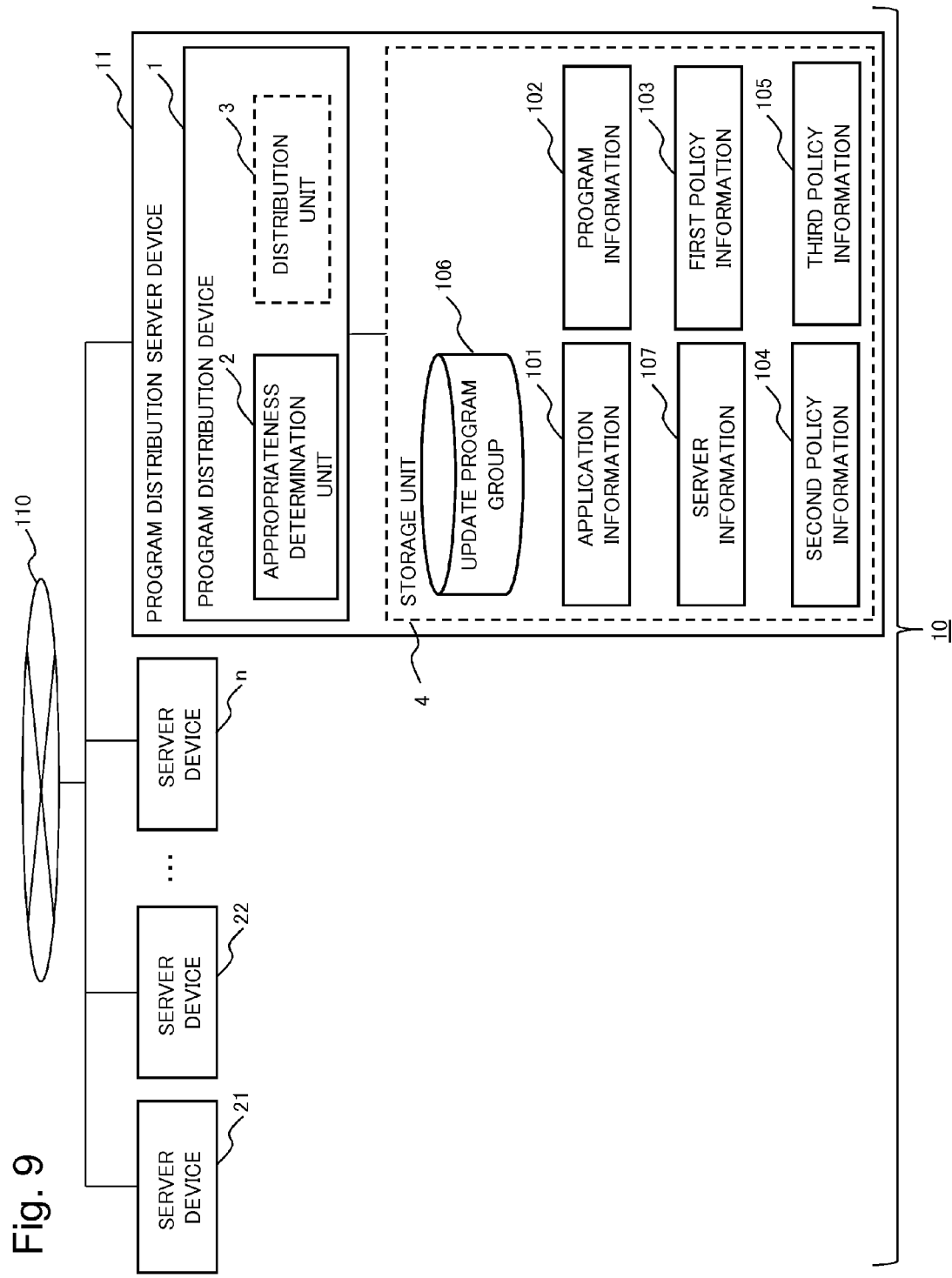
FIG. 9 is a block diagram illustrating a configuration of a program distribution server device including a program distribution device in a second exemplary embodiment of the invention.

The distribution unit 3 is communicatively connected to the server devices and the like via an unillustrated communication network (e.g. a communication network 110 illustrated in FIG. 9). Further, the distribution unit 3 transmits and receives various information items such as update programs.

The storage unit 4 stores the application information 101, the program information 102, the first policy information 103, the second policy information 104, the third policy information 105, the update program group 106, and the server information 107.

The storage unit 4 is a non-volatile storage device capable of reading and writing data by a computer. More specifically, an example of the storage unit 4 to be used is, a non-volatile storage device such as a hard disk drive (hereinafter, called as a "HDD") loaded in an electronic device such as a server device.

Another example of the storage unit 4 to be used is a storage device (not illustrated) connected to an unillustrated communication network. The invention described by way of the present exemplary embodiment is not limited to the aforementioned configuration (the same idea as described above is also applied to the following respective exemplary embodiments).

In the following, the appropriateness determination processing to be executed by the appropriateness determination unit 2 in the present exemplary embodiment is described in more detail.

Figure 5A:
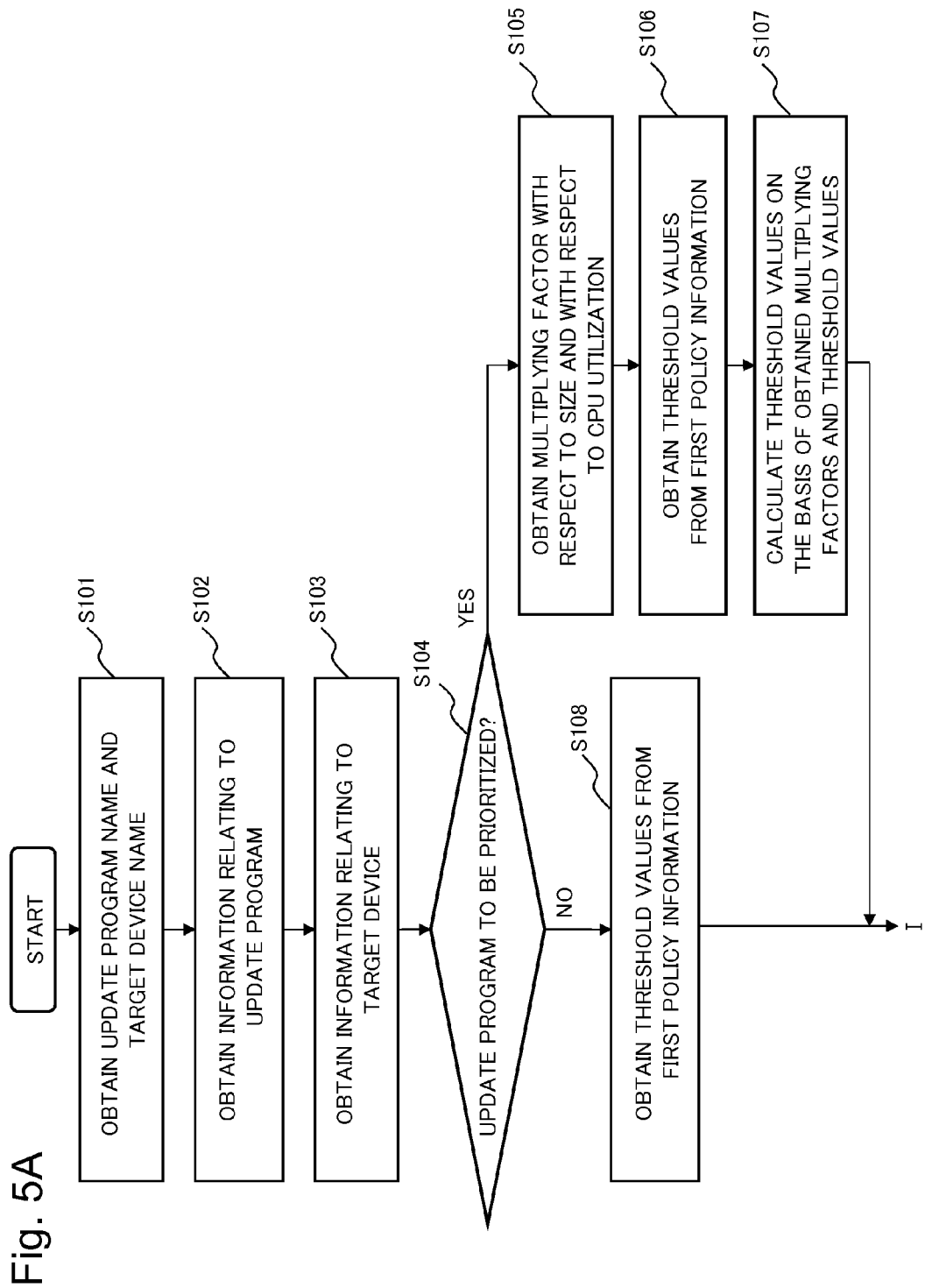
FIG. 5A is a first half of a flowchart illustrating an appropriateness determination processing of an update program to be performed by an appropriateness determination unit in the first exemplary embodiment of the invention.
Figure 5B:
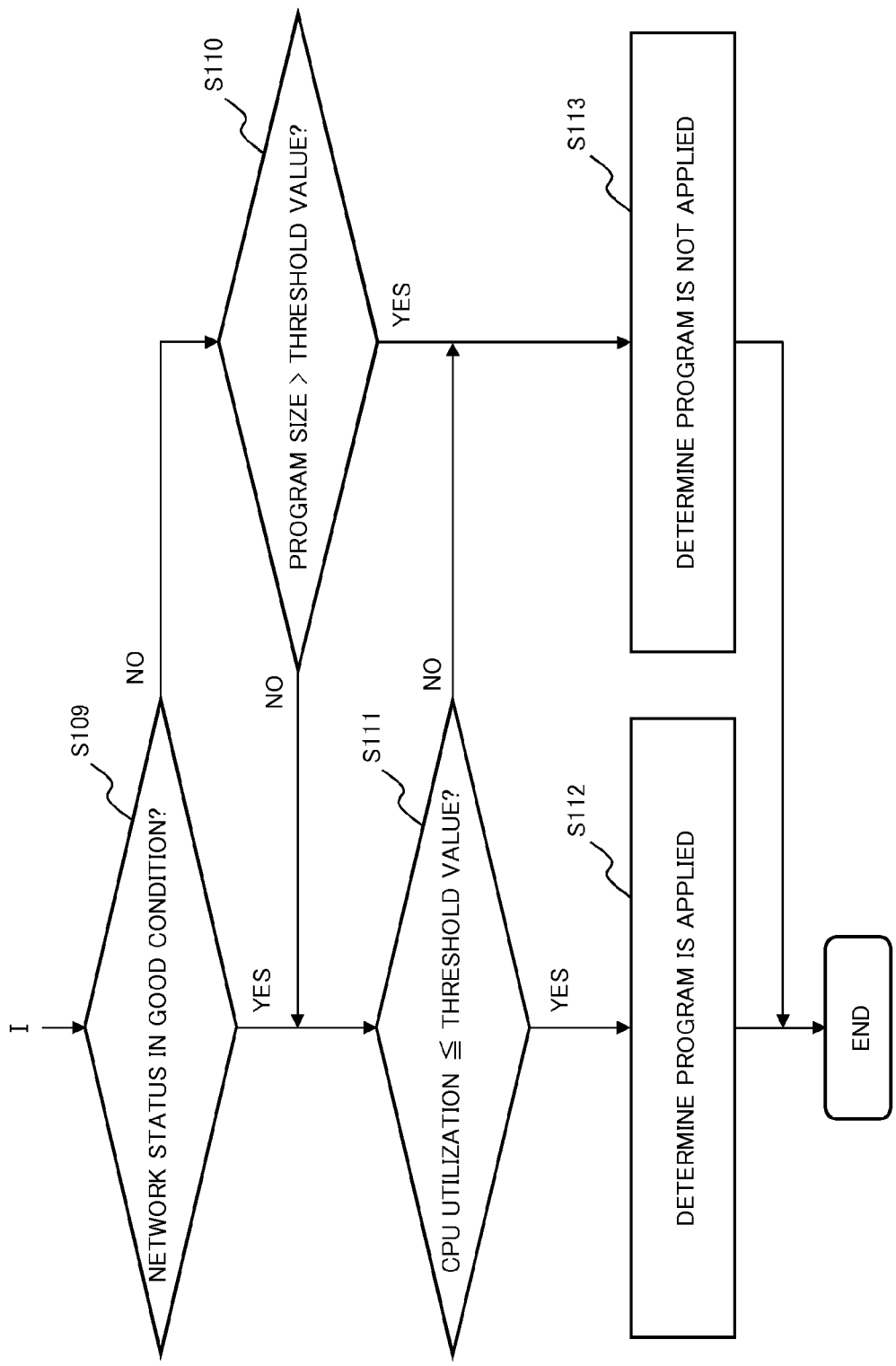
FIG. 5B is a second half of the flowchart illustrating the appropriateness determination processing of the update program to be performed by the appropriateness determination unit in the first exemplary embodiment of the invention.

FIG. 5A and FIG. 5B are a flowchart illustrating the appropriateness determination processing of the update program to be performed by the appropriateness determination unit 2 with respect to the server device in the first exemplary embodiment of the invention. The operation procedure to be performed by the appropriateness determination unit 2 is described in accordance with the flowchart.

Step S101:

The appropriateness determination unit 2 refers to the application determination list. The appropriateness determination unit 2 obtains "update program name" and "server device name" from the application determination list. Specifically, the appropriateness determination unit 2 obtains the name of an update program to be distributed, and the name of a target device (server device) to which the update program is applied.

The appropriateness determination unit 2 obtains "update program name" and "server device name" in the descending order from the application determination list, out of one or more "update program names" and "server device names" included in the application determination list.

Step S102:

The appropriateness determination unit 2 refers to the program information 102 on the basis of the obtained "update program name". Further, the appropriateness determination unit 2 obtains "degree of priority for update program", "degree of importance for update program", "type of update program", and "size of update program", which are associated with "update program name" from the program information 102.

Step S103:

The appropriateness determination unit 2 refers to the server information 107 on the basis of the obtained "server device name". Further, the appropriateness determination unit 2 obtains "degree of importance for server device", "purpose of use of server device", "CPU utilization", and "network status", which are associated with "server device name" from the server information 107. CPU stands for Central Processing Unit.

The server information 107 is described in more detail.

The server information 107 is information relating to one or more target devices (server devices) to be managed by the program distribution device 1.

More specifically, the server information 107 includes the following information items, for each of the one or more server devices.

"server device name",

"degree of importance for server device" representing a degree of importance of a server device, "purpose of use of server device" representing a purpose of use, "CPU utilization" representing a load status with respect to a server device, and "network status" representing a load status of a network with respect to a server device The server information 107 includes information such that "degree of importance for server device", "purpose of use of server device", "CPU utilization", and "network status" are associated with "server device name" as a key.

The invention described by way of example of the present exemplary embodiment is not limited to the aforementioned configuration. The server information 107 may further include other management items relating to the server devices, such as a memory capacity (the same idea as described above is also applied to the following respective exemplary embodiments).

FIG. 6 is a diagram concretely exemplifying the server information 107 in the first exemplary embodiment of the invention.

The first column of the server information 107 shown in FIG. 6 illustrates "server device name". The second column illustrates "degree of importance for server device". The third column illustrates "purpose of use of server device". The fourth column illustrates "CPU utilization". The fifth column illustrates "network status". The sixth column and thereafter illustrate other management items.

More specifically, "purpose of use of server device" may be set by the manager in accordance with the purposes of use of server devices, for instance.

In the present exemplary embodiment, to simply the description, "CPU utilization" illustrated in FIG. 6 includes a load ratio. The exemplary embodiment of the invention, however, is not limited to the aforementioned configuration. "CPU utilization" may include information such that load statuses are classified into "high", "medium", and "low" in the descending order of the load in accordance with the load of the CPU.

"Network status" includes, for instance, information such that load statuses of the network with respect to the server device are classified into the ranks, i.e., "in poor condition", "moderately poor", "moderately good", and "in good condition" in the descending order of the load of the network.

Step S104:

The appropriateness determination unit 2 determines whether or not an update program to be distributed is an update program to be prioritized for the target device, on the basis of the obtained "degree of priority for update program".

More specifically, for instance, when the information representing "degree of priority for update program" is either the rank "A" or the rank "B", the appropriateness determination unit 2 determines that the update program to be distributed is an update program to be prioritized for the target device. The invention described by way of example of the present exemplary embodiment is not limited to the aforementioned configuration (the same idea as described above is also applied to the following respective exemplary embodiments).

"YES" in Step S104:

When the appropriateness determination unit 2 determines that the update program to be distributed is an update program to be prioritized, as a result of determination as to whether or not the update program to be distributed is an update program to be prioritized for the server device, the process is proceeded to Step S105.

More specifically, for instance, when the obtained "degree of priority for update program" is either the rank "A" or the rank "B" representing that the update program is of high priority for the target device, the appropriateness determination unit 2 determines that the update program to be distributed is an update program to be prioritized for the target device.

"NO" in Step S104:

When the appropriateness determination unit 2 determines that the update program to be distributed is not an update program to be prioritized, as a result of determination as to whether or not the update program to be distributed is an update program to be prioritized for the server device, the process is proceeded to Step S108.

More specifically, for instance, when the obtained "degree of priority for update program" is the rank "C" representing that the update program is of less priority for the target device, the appropriateness determination unit 2 determines that the update program to be distributed is an update program of less priority for the target device.

Step S105:

The appropriateness determination unit 2 refers to the second policy information 104 on the basis of the obtained "purpose of use of server device" and "degree of priority for update program". Further, the appropriateness determination unit 2 obtains "multiplying factor with respect to update program size" and "multiplying factor with respect to CPU utilization", which are associated with "purpose of use of server device" and "degree of priority for update program" from the second policy information 104.

The second policy information 104 is described in more detail.

The second policy information 104 includes at least "multiplying factor with respect to update program size" and "multiplying factor with respect to CPU utilization", which are defined in accordance with the purposes of use of target devices and in accordance with the degrees of priority for update programs with respect to the target devices.

More specifically, the second policy information 104 includes "multiplying factor with respect to update program size" and "multiplying factor with respect to CPU utilization", which are set for each of the purposes of use of server devices and for each of the degrees of priority for update programs. In other words, the second policy information 104 includes information such that "purpose of use of server device", "degree of priority for update program", "multiplying factor with respect to update program size", and "multiplying factor with respect to CPU utilization" are associated with each other.

FIG. 7 is a diagram concretely exemplifying the second policy information 104 in the first exemplary embodiment of the invention.

The first column of the second policy information 104 shown in FIG. 7 illustrates "purpose of use of server device". The second column illustrates "degree of priority for update program". The third column illustrates "multiplying factor with respect to update program size". The fourth column illustrates "multiplying factor with respect to CPU utilization".

It is desirable to set each of the multiplying factors included in the second policy information 104 in such a manner that the update program to be prioritized for the target device is easily more applicable.

Step S106:

The appropriateness determination unit 2 refers to the first policy information 103, on the basis of the obtained "type of update program", "degree of importance for update program", and "degree of importance for server device". The appropriateness determination unit 2 obtains "threshold value for network status", "threshold value for update program size", and "threshold value for CPU utilization", which are associated with "type of update program", "degree of importance for update program", and "degree of importance for server device" from the first policy information 103.

The first policy information 103 is described in more detail.

The first policy information 103 includes at least "threshold value for network status", "threshold value for update program size", and "threshold value for CPU utilization", which are defined in accordance with the types of update programs, the degrees of significance of the update programs, and the degrees of significance of target devices. "Threshold value for network status" is used when the network status is determined. "Threshold value for update program size" is used when the update program size is determined. "Threshold value for CPU utilization" is used when the CPU utilization is determined.

More specifically, the first policy information 103 includes "threshold value for network status", "threshold value for update program size", and "threshold value for CPU utilization", which are set for each of the types of update programs, for each of the degrees of significance of update programs, and for each of the degrees of significance of target devices. In other words, the first policy information 103 includes information such that "type of update program", "degree of importance for update program", "degree of importance for server device", "threshold value for network status", "threshold value for update program size", and "threshold value for CPU utilization" are associated with each other.

FIG. 8 is a diagram concretely exemplifying the first policy information 103 in the first exemplary embodiment of the invention.

The first column of the first policy information 103 shown in FIG. 8 illustrates "type of update program". The second column illustrates "degree of importance for update program". The third column illustrates "degree of importance for server device". The fourth column illustrates "threshold value for network status". The fifth column illustrates "threshold value for update program size". The sixth column illustrates "threshold value for CPU utilization".

It is desirable to set each of the threshold values included in the first policy information 103 in such a manner that the update program whose degree of urgency is high and whose degree of importance is high is easily more applicable, as compared with the update program whose purpose is to improve the performance or to add a function and having a moderately low degree of urgency. For instance, the threshold values may be set in such a manner that the update program whose degree of urgency is high and whose degree of importance is high is easily more applicable, regardless that the network status is "in poor condition".

Step S107:

The appropriateness determination unit 2 newly calculates "threshold value for update program size", on the basis of the obtained "threshold value for update program size", and the obtained "multiplying factor with respect to update program size". Further, the appropriateness determination unit 2 newly calculates "threshold value for CPU utilization", on the basis of the obtained "threshold value for CPU utilization" and the obtained "multiplying factor with respect to CPU utilization".

More specifically, the appropriateness determination unit 2 multiplies the obtained "threshold value for update program size" with "multiplying factor with respect to update program size" for calculating "threshold value for update program size". Further, the appropriateness determination unit 2 multiplies the obtained "threshold value for CPU utilization" with "multiplying factor with respect to CPU utilization" for calculating "threshold value for CPU utilization".

Step S108:

The appropriateness determination unit 2 refers to the first policy information 103, on the basis of the obtained "type of update program", "degree of importance for update program", and "degree of importance for server device". The appropriateness determination unit 2 obtains "threshold value for network status", "threshold value for update program size", and "threshold value for CPU utilization", which are associated with "type of update program", "degree of importance for update program", and "degree of importance for server device" from the first policy information 103.

Step S109:

The appropriateness determination unit 2 determines whether or not it is appropriate to apply the update program to the target device in accordance with the network status with respect to the server device. Specifically, the appropriateness determination unit 2 determines the network status with respect to the server device on the basis of "network status" obtained in Step S103, and "threshold value for network status".

More specifically, in the following, as an example, it is assumed that the obtained "threshold value for network status" represents "moderately poor or in poor condition". When "network status" obtained in Step S103 represents either of "in poor condition" or "moderately poor", the appropriateness determination unit 2 determines that the network status with respect to the target device is "in poor condition". On the other hand, when "network status" obtained in Step S103 represents either of "in good condition" or "moderately good", the appropriateness determination unit 2 determines that the network status with respect to the target device is "in good condition".

As another example, it is assumed that the obtained "threshold value for network status" represents "in poor condition". When "network status" obtained in Step S103 represents "in poor condition", the appropriateness determination unit 2 determines that the network status with respect to the target device is "in poor condition". On the other hand, when "network status" obtained in Step S103 represents one of "in good condition", "moderately good", and "moderately poor", the appropriateness determination unit 2 determines that the network status with respect to the target device is "in good condition".

As described above, when "network status" with respect to the target device is included in "threshold value for network status", the appropriateness determination unit 2 determines that the network status is "in poor condition". On the other hand, when "network status" with respect to the target device is not included in "threshold value for network status", the appropriateness determination unit 2 determines that the network status is "in good condition".

"YES" in Step S109:

When the appropriateness determination unit 2 determines that the network status with respect to the server device is "in good condition", as a result of determination on the network status, the process is proceeded to Step S111.

"NO" in Step S109:

When the appropriateness determination unit 2 determines that the network status with respect to the server device is "in poor condition", as a result of determination on the network status, the process is proceeded to Step S110.

Step S110:

The appropriateness determination unit 2 determines whether or not it is appropriate to apply the update program to the target device in accordance with the file size of the update program to be distributed. Specifically, the appropriateness determination unit 2 determines whether or not it is appropriate to apply the update program to the target device on the basis of "size of update program" and "threshold value for update program size".

More specifically, the appropriateness determination unit 2 compares between "size of update program" obtained in Step S102, and "threshold value for update program size".

"YES" in Step S110:

When the appropriateness determination unit 2 determines that "size of update program" is larger than "threshold value for update program size", as a result of comparison between the obtained "size of update program", and "threshold value for update program size", the process is proceeded to Step S113.

"NO" in Step S110:

When the appropriateness determination unit 2 determines that "size of update program" is not larger than "threshold value for update program size", as a result of comparison between the obtained "size of update program", and "threshold value for update program size", the process is proceeded to Step S111.

Step S111:

The appropriateness determination unit 2 determines whether or not it is appropriate to apply the update program to the target device in accordance with "CPU utilization" of the target device. Specifically, the appropriateness determination unit 2 determines whether or not it is appropriate to apply the update program to the target device on the basis of "CPU utilization" and "threshold value for CPU utilization".

More specifically, the appropriateness determination unit 2 compares between "CPU utilization" obtained in Step S103, and "threshold value for CPU utilization".

"YES" in Step S111:

When the appropriateness determination unit 2 determines that the obtained "CPU utilization" is equal to or smaller than "threshold value for CPU utilization", as a result of comparison between the obtained "CPU utilization", and "threshold value for CPU utilization", the process is proceeded to Step S112. Specifically, when the appropriateness determination unit 2 determines that "CPU utilization" is equal to or smaller than a predetermined specified value, as a result of comparison, the process is proceeded to Step S112.

"NO" in Step S111:

When the appropriateness determination unit 2 determines that the obtained "CPU utilization" is larger than "threshold value for CPU utilization" (in other words, the obtained "CPU utilization" exceeds a predetermined specified value), as a result of comparison between the obtained "CPU utilization", and "threshold value for CPU utilization", the process is proceeded to Step S113.

Step S112:

The appropriateness determination unit 2 determines that the update program is applied to the target device.

Step S113:

The appropriateness determination unit 2 determines that the update program is not applied to the target device (in other words, non-application).

In this way, according to the program distribution device 1 in the present exemplary embodiment, it is possible to distribute programs in a more appropriate order with respect to an electronic device to which the programs are distributed. This is because of the following reason.

Specifically, the appropriateness determination unit 2 determines whether or not an update program is applied to the server device, on the basis of policy information, which is defined in accordance with the degrees of significance and the purposes of use of server devices to which update programs are distributed, and in accordance with the types and the degrees of significance of update programs to be distributed. Further, the appropriateness determination unit 2 is capable of distributing, to the server device via the distribution unit 3, the update program included in the update program group 106 stored in the storage unit 4, when it is determined that the update program is applied to the server device. Therefore, for instance, the program distribution device 1 is capable of prioritizing distribution of the update program whose degree of urgency is high and whose degree of importance is high, such as the program providing measures against a virus, which may affect the other devices. In other words, the server device to which the update program is distributed can promptly apply the update program. On the other hand, the program distribution device 1 is capable of delaying distribution of the update program of a low degree of urgency, for instance.

In this way, the program distribution device 1 is capable of executing the update program appropriateness determination, and adjusting distribution of update programs on the basis of the aforementioned policy information. Thus, the program distribution device 1 is advantageous in applying update programs in a more appropriate order, as compared with a configuration, in which update program appropriateness determination is executed merely on the basis of the load status of the network or the load status of the CPU.

Second Exemplary Embodiment

In this section, a second exemplary embodiment based on the program distribution device 1 in the first exemplary embodiment of the invention is described. The following description is made mainly on the basis of the features of the second exemplary embodiment. The same elements as those in the first exemplary embodiment are indicated with the same reference numerals, and repeated description thereof is omitted.

A program distribution device 1 in the second exemplary embodiment of the invention is described referring to FIG. 5A, FIG. 5B, and FIGS. 9 to 11.

FIG. 9 is a block diagram illustrating a configuration of a program distribution server device 11 including the program distribution device 1 in the second exemplary embodiment of the invention.

In FIG. 9, a program distribution system 10 includes the program distribution server device 11 having the program distribution device 1, and one or more server devices (21 to n). The program distribution server device 11, and the one or more server devices (21 to n) are communicatively connected to each other via a communication network 110.

The program distribution device 1 includes the appropriateness determination unit 2. The program distribution device 1 distributes update programs to the one or more server devices (21 to n). Further, the one or more server devices (21 to n) receive the update programs distributed from the program distribution device 1. The one or more server devices (21 to n) apply the received update programs thereto.

Examples of the communication network 110 are general communication lines such as various communication lines owned by mobile phone companies, and the Internet provided by internet service providers and the like. The invention described by way of example of the present exemplary embodiment is not limited to the aforementioned configuration (the same idea as described above is also applied to the following respective exemplary embodiments).

In the following, a processing of distributing update programs to the server devices (21 to n) by the program distribution device 1 in the present exemplary embodiment is described in more detail.

Figure 10:
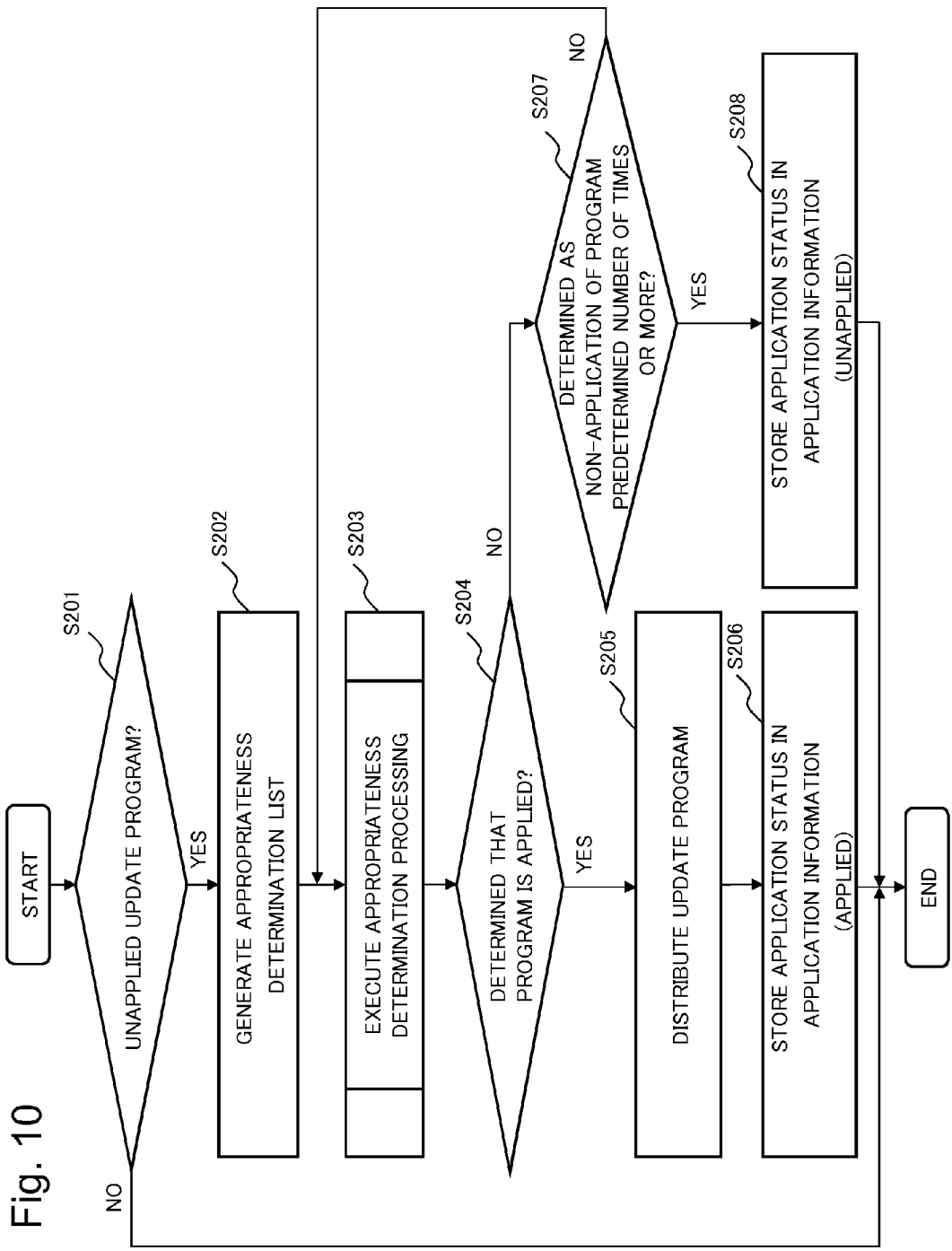
FIG. 10 is a flowchart illustrating a process of distributing update programs to a server device, which is performed by the program distribution device in the second exemplary embodiment of the invention.

FIG. 10 is a flowchart illustrating the processing of distributing update programs to server devices, which is performed by the program distribution device 1 in the second exemplary embodiment of the invention. The operation procedure to be performed by the program distribution device 1 is described in accordance with the flowchart.

In the following, to simplify the description, for instance, it is assumed that the program distribution device 1 distributes update programs to the server devices (21 to n).

To simplify the description, the description is made with an example of the aforementioned configuration. The invention described by way of example of the present exemplary embodiment, however, is not limited to the aforementioned configuration (the same idea as described above is also applied to the following respective exemplary embodiments.

Step S201:

The appropriateness determination unit 2 determines the presence or absence of an update program which is not applied to the server device 21 on the basis of application information 101 stored in the storage unit 4.

More specifically, the appropriateness determination unit 2 refers to the application information 101 stored in the storage unit 4. The appropriateness determination unit 2 determines the presence or absence of an update program which is not applied to the server devices managed by the program distribution device 1, on the basis of information representing "application status of update program" included in the application information 101. In other words, the appropriateness determination unit 2 determines, regarding the information representing "application status of update program" included in the application information 101, the presence or absence of one of information "N" representing that an update program is unapplied, and information "-" representing that it is not confirmed whether or not the update program has been applied.

"YES" in Step S201:

When the appropriateness determination unit 2 determines that there is an unapplied update program, as a result of determination as to the presence or absence of an update program which is not applied to the server device on the basis of the application information 101, the process is proceeded to Step S202.

"NO" in Step S201:

When the appropriateness determination unit 2 determines that there is no unapplied update program, as a result of determination as to the presence or absence of an update program which is not applied to the server device on the basis of the application information 101, the process is ended.

Step S202:

The appropriateness determination unit 2 generates an application determination list on the basis of the application information 101 and the program information 102 stored in the storage unit 4.

Step S203:

The appropriateness determination unit 2 executes the appropriateness determination processing of the update program described referring to the flowchart illustrated in FIG. 5A and FIG. 5B with respect to the server devices included in the application determination list. Therefore, repeated description on the appropriateness determination processing of the update program is omitted.

Step S204:

The appropriateness determination unit 2 determines whether the update program is distributed to the server device, or the appropriateness determination processing is retried in accordance with a result of determination by the appropriateness determination processing of the update program.

"YES" in Step S204:

When the appropriateness determination unit 2 determines that the update program is applied to the server device in the appropriateness determination processing, the process is proceeded to Step S205.

"NO in Step S204:

When the appropriateness determination unit 2 determines that the update program is not applied to the server device in the appropriateness determination processing, the process is proceeded to Step S207.

Step S205

The appropriateness determination unit 2 distributes the update program included in the update program group 106 stored in the storage unit 4 to the server device via the distribution unit 3.

Step S206:

The appropriateness determination unit 2 includes, in the application information 101, information representing that the update program has been applied to the server device, on the basis of "server device name" of the server device, and "update program name" of the distributed update program. In other words, the appropriateness determination unit 2 includes, in the application information 101, information representing that the update program has already been applied to the server device.

More specifically, the appropriateness determination unit 2 updates the information representing "application status", which is associated with "server device name" and "update program name" included in the application information 101 to information "Y" representing that the update program has been applied to the server device. In other words, the appropriateness determination unit 2 includes the information "Y" in "application status of update program", which is associated with "server device name" and "update program name".

Step S207:

The appropriateness determination unit 2 determines whether or not the number of times of execution of the appropriateness determination processing has reached the predetermined number of times. Specifically, the appropriateness determination unit 2 determines whether or not the update program is determined as non-application the predetermined number of times or more in the appropriateness determination processing.

More specifically, the appropriateness determination unit 2 refers to third policy information 105 stored in the storage unit 4, on the basis of the obtained "type of update program" and "degree of importance for server device". Further, the appropriateness determination unit 2 obtains "number of times of retrying", which is associated with "type of update program" and "degree of importance for server device" from the referred third policy information 105.

Then, the appropriateness determination unit 2 determines whether or not the number of times of execution of the appropriateness determination processing is equal to or larger than the obtained "number of times of retrying" on the basis of "number of times of retrying".

The third policy information 105 is described in more detail.

The third policy information 105 includes at least "number of times of retrying", which is defined in accordance with the types of update programs and the degrees of significance of target devices.

More specifically, the third policy information 105 includes information representing the set "number of times of retrying", for each of the types of update programs and the degrees of significance of target devices. In other words, the third policy information 105 includes information such that "type of update program", "degree of importance for server device", and "number of times of retrying" are associated with each other.

FIG. 11 is a diagram concretely exemplifying the third policy information 105 in the second exemplary embodiment of the invention.

The first column of the third policy information 105 shown in FIG. 11 illustrates "type of update program". The second column illustrates "degree of importance for server device". The third column illustrates "number of times of retrying".

The number of times of retrying included in the third policy information 105 may be set in accordance with the types of update programs. More specifically, the number of times of retrying may be set high with respect to an update program whose application is prioritized for the purpose of providing security measures, correcting defects or the like. On the other hand, the number of times of retrying may be set low with respect to an update program whose purpose is to improve the performance, to add a function or the like and having a low degree of urgency.

Further, the number of times of retrying may be set in accordance with the degrees of significance of target devices. More specifically, the number of times of retrying may be set high, when the degree of importance of the target device is high. On the other hand, the number of times of retrying may be set low, when the degree of importance of the target device is low.

"YES" in Step S207:

When the appropriateness determination unit 2 determines that the number of times of execution of the appropriateness determination processing has reached the obtained "number of times of retrying", as a result of determination as to whether or not the number of times of execution has reached the obtained "number of times of retrying", the process is proceeded to Step S208.

"NO" in Step S207:

When the appropriateness determination unit 2 determines that the number of times of execution has not reached the obtained "number of times of retrying", as a result of determination as to whether or not the number of times of execution has reached the obtained "number of times of retrying", the process is returned to Step S203.

Step S208:

The appropriateness determination unit 2 includes, in the application information 101, information representing that the update program is not applied to the server device 21, on the basis of "server device name" of the server device 21 and "update program name".

More specifically, the appropriateness determination unit 2 updates information representing "application status", which is associated with "server device name" and "update program name" included in the application information 101 to information "N" representing that the update program is not applied to the server device. In other words, the appropriateness determination unit 2 includes the information "N" in "application status of update program", which is associated with "server device name" and "update program name".

The appropriateness determination unit 2 repeatedly executes the aforementioned process until the appropriateness determination unit 2 determines that there is no unapplied update program with respect to the server devices managed by the program distribution device 1 on the basis of the application information 101.

As described above, according to the program distribution device 1 in the second exemplary embodiment, it is possible to obtain substantially the same advantageous effects as described in the first exemplary embodiment. According to the present exemplary embodiment, it is possible to distribute programs in a more appropriate order with respect to a number of server devices. In other words, the program distribution device 1 is advantageously applied to a program distribution system. This is because of the following reason.

The appropriateness determination unit 2 is capable of distributing update programs to the target device in the descending order of the degree of urgency and the degree of importance, on the basis of the generated application determination list, even if there is one or more server devices.

(Example of Hardware Configuration)

The respective units in the aforementioned exemplary embodiments which have been described referring to the drawings may be regarded as functional units of a software program (processing units or software modules). Each of the software modules may be implemented by a dedicated hardware resource. The configuration of dividing a system into units as illustrated in the drawings is a configuration provided to simplify the description. A variety of configurations may be provided when the system is actually mounted. An example of the hardware environment when the system is actually mounted is described referring to FIG. 12.

Figure 12:
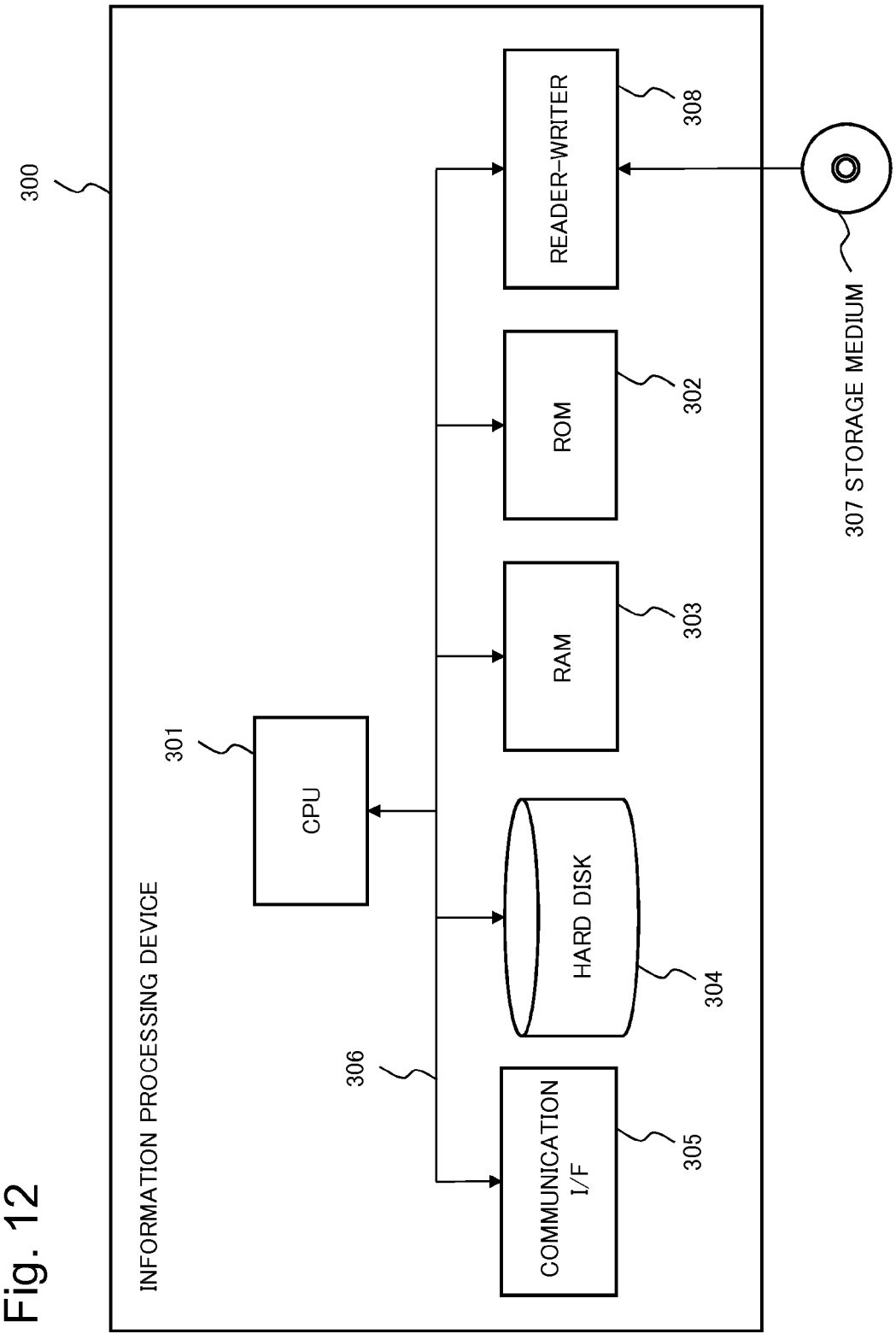
FIG. 12 is a block diagram describing a hardware configuration example of an information processing device capable of implementing the respective exemplary embodiments of the invention.

FIG. 12 is a diagram describing a configuration example of an information processing device 300 (computer) capable of executing a program distribution device according to an exemplary embodiment of the invention. Specifically, FIG. 12 represents the configuration of the computer (information processing device) such as a server, and represents a hardware environment capable of implementing the respective functions described in the aforementioned exemplary embodiments. The computer is capable of implementing a program distribution device as the whole or part of the program distribution device 1 (FIG. 1), or of the program distribution device 1 (FIG. 9).

The information processing device 300 illustrated in FIG. 12 is a general computer, in which the following elements are connected to each other via a bus 306 (communication line).
 a CPU 301,
 a ROM (Read Only Memory) 302,
 a RAM (Random Access Memory) 303,
 a hard disk (storage device) 304,
 a communication interface (Interface, hereinafter, called as "I/F") 305 to be communicated with an external device, and
 a reader-writer 308 capable of reading and writing data stored in a storage medium 307 such as a CD-ROM (Compact Disc Read Only Memory).

The invention described by way of example of the aforementioned exemplary embodiments is accomplished by the following procedure. Specifically, a computer program capable of implementing the functions illustrated in the block configuration diagrams (FIG. 1, FIG. 9), or the flowcharts (FIG. 5A, FIG. 5B, FIG. 10), which have been referred to in describing the aforementioned exemplary embodiments, is supplied to the information processing device 300 illustrated in FIG. 12. Thereafter, the computer program is read and executed by the CPU 301 as the hardware resource for accomplishment. The computer program supplied in the device may be stored in a temporary storage memory (RAM 303) capable of reading and writing, or in a non-volatile storage device such as the hard disk 304.

Further, in the foregoing configuration, the method for supplying a computer program into the hardware resource may be a currently available general method. For instance, the supply method may be a method for installing the computer program in the device via various storage media 307 such as a CD-ROM, and a method for downloading the computer program from the outside via a communication line such as the Internet. In the above configuration, the present invention may be construed as codes configuring the computer program, or as a non-transitory computer readable storage medium in which the codes are stored.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

DESCRIPTION OF REFERENCE NUMERALS

1 Program distribution device
2 Appropriateness determination unit
3 Distribution unit
4 Storage unit
10 Program distribution system
11 Program distribution server device
21, 22, n Server device
101 Application information
102 Program information
103 First policy information 104 Second policy information
105 Third policy information
106 Update program group
107 Server information
110 Communication network
300 Information processing device
301 CPU
302 ROM
303 RAM
304 Hard disk
305 Communication interface
306 Bus
307 Storage medium
308 Reader-writer

The invention claimed is:

1. A program distribution device comprising:
a processor and a memory,
an appropriateness determination unit that executes an appropriateness determination processing, which determines whether or not an update program is applied to a target device to which the update program is applied on the basis of policy information, the policy information being defined in accordance with a degree of importance and a purpose of use of the target device and in accordance with a type and a degree of importance for the update program, and distributes the update program to the target device via a distribution unit when it is determined that the update program is applied to the target device, wherein
in the appropriateness determination processing,
the appropriateness determination unit determines whether or not the update program is an update program to be prioritized for the target device on the basis of a degree of priority for the update program representing whether or not the update program is an update program to be prioritized,
the appropriateness determination unit obtains threshold values from the policy information, when it is determined that the update program is not an update program to be prioritized, and
the appropriateness determination unit newly calculates threshold values on the basis of a multiplying factor with respect to a file size of the update program, a multiplying factor with respect to a CPU utilization in the target device, and the threshold values, the multiplying factors being defined in accordance with the purpose of use of the target device and in accordance with the degree of priority for the update program, when it is determined that the update program is an update program to be prioritized.

2. The program distribution device according to claim 1, wherein
in the appropriateness determination processing, the appropriateness determination unit determines that the update program is applied to the target device, when each of a load status of a network in the target device, a load status of a CPU in the target device, and a file size of the update program satisfy the threshold values included in the policy information.

3. The program distribution device according to claim 1, wherein
when it is determined that the update program is not applied to the target device, as a result of determination as to whether or not the update program is applied to the target device, the appropriateness determination unit repeatedly executes the appropriateness determination processing on the basis of a number of times of retrying, the number of times of retrying being defined in accordance with the type of the update program and the degree of importance for the target device, and
when the appropriateness determination processing is repeated until the number of times of execution of the appropriateness determination processing has reached the number of times of retrying, the appropriateness determination unit postpones application of the update program to the target device.

4. The program distribution device according to claim 1, wherein
the appropriateness determination unit generates an application determination list including information relating to the target device, and the update program which is not applied to the target device in the descending order of the type of the update program and the degree of importance for the target device, executes the appropriateness determination processing on the basis of the generated application determination list, and distributes the update program to the target device via the distribution unit.

5. The program distribution device according to claim 1, wherein the policy information includes:
first policy information including at least a threshold value for a load status of a network, a threshold value for a file size of an update program, and a threshold value for a CPU utilization which are defined in accordance with the type and the degree of importance for the update program and the degree of importance for the target device;
second policy information including at least a multiplying factor with respect to a file size of an update program, and a multiplying factor with respect to a CPU utilization in the target device which are defined in accordance with the purpose of use of the target device and a degree of priority for the update program; and
third policy information including at least the number of times of retrying which is defined in accordance with the type of the update program and the degree of importance for the target device.

6. A program distribution system comprising:
the program distribution device according to claim 1; and
one or more server devices communicatively connected to the program distribution device via a communication network, wherein
the server device receives the update program from the program distribution device, and applies the received update program thereto.

7. A program distribution method comprising, causing an information processing device to:
execute an appropriateness determination processing, comprising
determining whether or not an update program is applied to a target device to which the update program is applied on the basis of policy information, the policy information being defined in accordance with a degree of importance and a purpose of use of the target device and in accordance with a type and a degree of importance for the update program,
determining whether or not the update program is an update program to be prioritized for the target device on the basis of a degree of priority for the update program representing whether or not the update program is an update program to be prioritized,
obtaining threshold values from the policy information, when it is determined that the update program is not an update program to be prioritized, and newly calculating threshold values on the basis of a multiplying factor with respect to a file size of the update program, a multiplying factor with respect to a CPU utilization in the target device, and the threshold values, the multiplying factors being defined in accordance with the purpose of use of the target device and in accordance with the degree of priority for the update program, when it is determined that the update program is an update program to be prioritized; and distribute the update program to the target device via a distribution unit when it is determined that the update program is applied to the target device.

8. A non-transitory computer readable storage medium storing a computer program, the causes a computer to execute:

a function that performs an appropriateness determination processing, comprising, determining whether or not an update program is applied to a target device to which the update program is applied on the basis of policy information, the policy information being defined in accordance with a degree of importance and a purpose of use of the target device and in accordance with a type and a degree of importance for the update program determining whether or not the update program is an update program to be prioritized for the target device on the basis of a degree of priority for the update program representing whether or not the update program is an update program to be prioritized, obtaining threshold values from the policy information, when it is determined that the update program is not an update program to be prioritized, and newly calculating threshold values on the basis of a multiplying factor with respect to a file size of the update program, a multiplying factor with respect to a CPU utilization in the target device, and the threshold values, the multiplying factors being defined in accordance with the purpose of use of the target device and in accordance with the degree of priority for the update program, when it is determined that the update program is an update program to be prioritized; and distributing the update program to the target device via a distribution unit when it is determined that the update program is applied to the target device.

* * * * *